(12) United States Patent
Anumula et al.

(10) Patent No.: US 8,239,403 B2
(45) Date of Patent: Aug. 7, 2012

(54) ENHANCING SOFT FILE SYSTEM LINKS

(75) Inventors: Venkata Naga Seshaiah Anumula, Hyperabad (IN); Bhyrav Murthy Mutnury, Austin, TX (US); Manish Sharma, Hyperabad (IN); Prashant Sreedharan, Hyperabad (IN)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 12/649,429

(22) Filed: Dec. 30, 2009

(65) Prior Publication Data

US 2011/0161344 A1    Jun. 30, 2011

(51) Int. Cl.
*G06F 17/30* (2006.01)

(52) U.S. Cl. .................................. 707/769; 707/822

(58) Field of Classification Search .................. 707/769, 707/822, 999.3
See application file for complete search history.

(56) References Cited

U.S. PATENT DOCUMENTS

| | | | |
|---|---|---|---|
| 5,832,527 A * | 11/1998 | Kawaguchi | 1/1 |
| 6,775,679 B2 | 8/2004 | Gupta | |
| 7,054,927 B2 | 5/2006 | Ulrich et al. | |
| 2002/0138502 A1 | 9/2002 | Gupta | |
| 2003/0158873 A1 * | 8/2003 | Sawdon et al. | 707/204 |
| 2008/0010325 A1 * | 1/2008 | Yamakawa | 707/204 |
| 2009/0216817 A1 * | 8/2009 | Normington et al. | 707/205 |
| 2010/0030739 A1 * | 2/2010 | Lanjewar et al. | 707/3 |
| 2010/0174684 A1 * | 7/2010 | Schwaab et al. | 707/655 |

OTHER PUBLICATIONS

Ames et al., Richer File System Metadata Using Links and Attributes, University of California, 12 pages, Apr. 2005.*
Ames et al., "Richer File System Metadata Using Links and Attributes", Proceedings of the 22nd IEEE/13th NASA Goddard Conference on Mass Storage Systems and Technologies (MSST 2005), Monterey, CA, Apr. 2005, pp. 101-112.

* cited by examiner

*Primary Examiner* — John Cottingham
*Assistant Examiner* — Noosha Arjomandi
(74) *Attorney, Agent, or Firm* — Yee & Associates, P.C.; David A. Mims, Jr.

(57) ABSTRACT

A method for determining whether a soft link of a target file is pointing to a correct file system is provided. A unique identification number for a mounted file system is retrieved from a storage device in response to receiving a request to access a target file in the mounted file system. In addition, an identification number is retrieved from a soft link of the target file in response to accessing the soft link of the target file in the storage device. Then, it is determined whether a match exists between the unique identification number for the mounted file system and the identification number from the soft link of the target file. In response to determining that a match does exist between the unique identification number for the mounted file system and the identification number from the soft link of the target file, access to the target file is allowed.

15 Claims, 5 Drawing Sheets

ENHANCING SOFT FILE SYSTEM LINKS

BACKGROUND

1. Field

The disclosure relates generally to an improved data processing system and more specifically to a computer implemented method, apparatus, and computer usable program code for uniquely associating a soft link for a target file to a particular file system within a plurality of file systems to ensure that the soft link is pointing to the correct file system.

2. Description of the Related Art

In modern computer systems today, collections of data are usually organized and stored as files. Files are typically stored on some type of data storage device, such as, for example, a hard disk drive, in a flat or hierarchical data structure called a file system. A file system allows users to organize, access, and manipulate these files. The data stored within the files of a file system have associated metadata to describe the data and allow access to the data.

A network storage system may provide a very large capacity for data storage using a redundant array of disk drives. A file system may provide access to this data stored on the network storage system by acting as a client for a network protocol. Also, a file system may be a virtual file system and exist only as an access method for virtual data that is dynamically generated and not stored.

Most operating systems provide a file system, as a file system is an integral part of any modern operating system. To gain access to files on, for example, a CD-ROM or some other type of a storage device, the operating system mounts the file system for that CD-ROM on a directory. This process is called mounting the file system. The directory is called the mount point. Generally, only an administrator or root user may authorize the mounting of file systems.

SUMMARY

According to one embodiment of the present invention, it is determined whether a soft link of a target file is pointing to a correct file system. A unique identification number for a mounted file system is retrieved from a storage device in response to receiving a request to access a target file in the mounted file system. In addition, an identification number is retrieved from a soft link of the target file in response to accessing the soft link of the target file in the storage device. Then, it is determined whether a match exists between the unique identification number for the mounted file system and the identification number from the soft link of the target file. In response to determining that a match does exist between the unique identification number for the mounted file system and the identification number from the soft link of the target file, access to the target file is allowed.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in a flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in a flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

Illustrative embodiments provide a computer implemented method, apparatus, and computer usable program code for uniquely associating a soft link of a target file to a particular file system within a plurality of file systems to ensure that the soft link is still pointing to the correct file system. A soft link, also known as a symbolic link or a symlink, is a special type of file that contains a reference to another target file or directory in the form of an absolute or relative file path. A path specifies a unique location in a file system. A path points to a file system location by following the directory tree hierarchy expressed in a string of characters in which path components, separated by a delimiting character, such as a slash, backward slash, or colon, represent each directory. Paths are used extensively to represent the directory/file relationships common in modern operating systems. A directory is an index to the files in a file system.

Soft links are supported by most modern operating systems. Soft links operate transparently for most operations. In other words, programs that perform, for example, read or write operations to files referenced by a soft link will behave as if operating directly on the target file. A soft link includes a text string, which the operating system interprets and follows as a path to another file. Soft links exist in contrast to hard links. Hard links do not normally point to directories and cannot link paths on different volumes.

The current way of creating a soft link to a target file within a file system on an operating system, such as a Unix-like operating system, is to only store the file path of the target file in the soft link. For example, suppose file system (FS1) is mounted on directory (/mnt) in an operating system. Also, suppose soft link (/home/link) is created to a target file (/mnt/file1) on mounted file system (FS1). In this example, the content of soft link (/home/link) is /mnt/file1, which is the path of the target file. Subsequently, all operations on soft link (/home/link) resolve the reference to /mnt/file1 and therefore apply all operations to the referenced target file /mnt/file1.

However, if after creation of soft link (/home/link) a second file system, say file system (FS2), is mounted over directory (/mnt) that is the mount point for file system (FS1), or file system (FS1) is un-mounted and file system (FS2) is mounted on directory (/mnt) that was the mount point for file system (FS1), and if a file exists with the same name in the same path on newly mounted file system (FS2), the previously created soft link (/home/link) will point to a different file on newly mounted file system (FS2) that is the wrong file system rather than pointing to the target file in file system (FS1) that is the correct file system. If the user that created the soft link (/home/link) is unaware of this change in the mounted file systems, the user will continue to use the existing soft link (/home/file1) and will eventually end up corrupting the file in newly mounted file system (FS2).

One possible solution to this problem is to manually keep track of which file system is pointing to which directory on the operating system. However, this solution is time-consuming and error prone. Illustrative embodiments overcome this problem by storing a number that uniquely identifies a file system, along with a target file path, in the soft link. Then, during link resolution, illustrative embodiments verify this number stored in the soft link with the unique identification number of the file system.

Illustrative embodiments may generate the unique number for the file system from, for example, system time while creating the file system and may store the unique identification number on the physical disk, along with metadata in the superblock for the created file system. System time is the computer system's notion of time passage and is measured in seconds. Because system time is measured in seconds and because a possibility exists that two file systems may be created in the same second, illustrative embodiments in addition to using system time may also utilize machine boot time, which is measured in milliseconds, to generate the unique identification number for the created file system. Thus, illustrative embodiments may utilize a unique identification number tuple to identify file systems. A tuple is one item containing two values. In other words, a unique identification number tuple for a file system includes a system time value and a machine boot time value. However, it should be noted that illustrative embodiments may utilize any means of generating a unique identification number for each file system within a plurality of file systems in a stand-alone computer and/or a network of data processing systems.

When a user creates a soft link to a target file on a mounted file system, illustrative embodiments store the unique identification number of the mounted file system, along with the file path to the target file, in the soft link. Illustrative embodiments then store the created soft link on the physical disk. Whenever the operating system accesses a soil link to, for example, perform a read, write, copy, or delete operation on a target file, illustrative embodiments match the number stored in the soft link with the unique identification number of the referenced file system. If the two identification numbers match, the soft link is still pointing to the correct file system. Consequently, illustrative embodiments will allow access to the target file to perform the desired operation on the target file. Otherwise, if the two identification numbers do not match, the soft link is pointing to the wrong or a different file system and, as a result, illustrative embodiments will deny access to the target file to prevent operations from being performed on the wrong file. Thus, illustrative embodiments may prevent wrong data usage, unauthorized data access, and unintentional data corruption.

Figure 1:
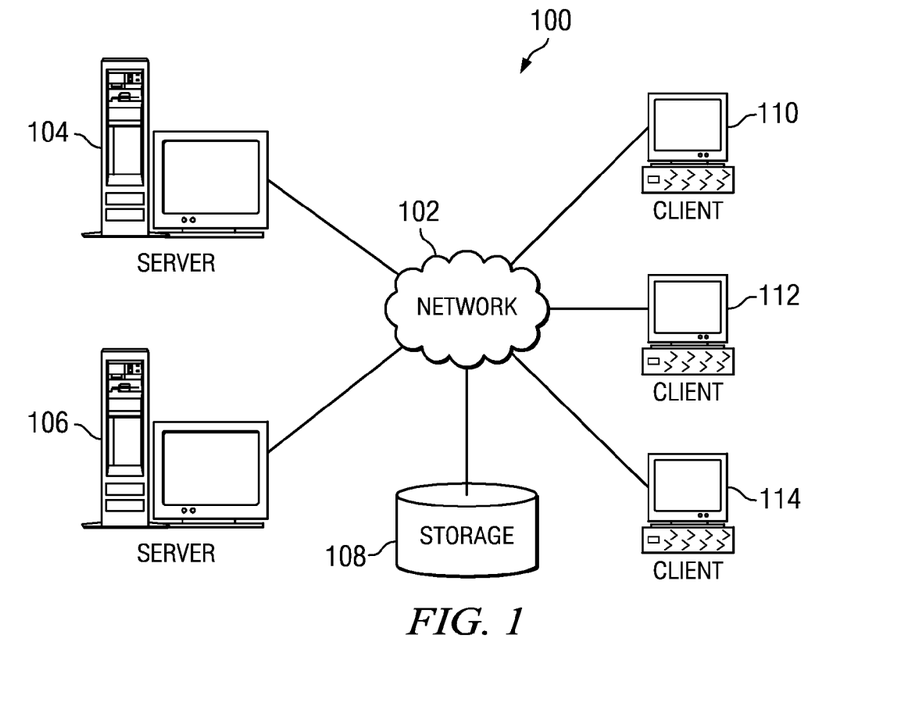
FIG. 1 is a pictorial representation of a network of data processing systems in which illustrative embodiments may be implemented.
Figure 2:
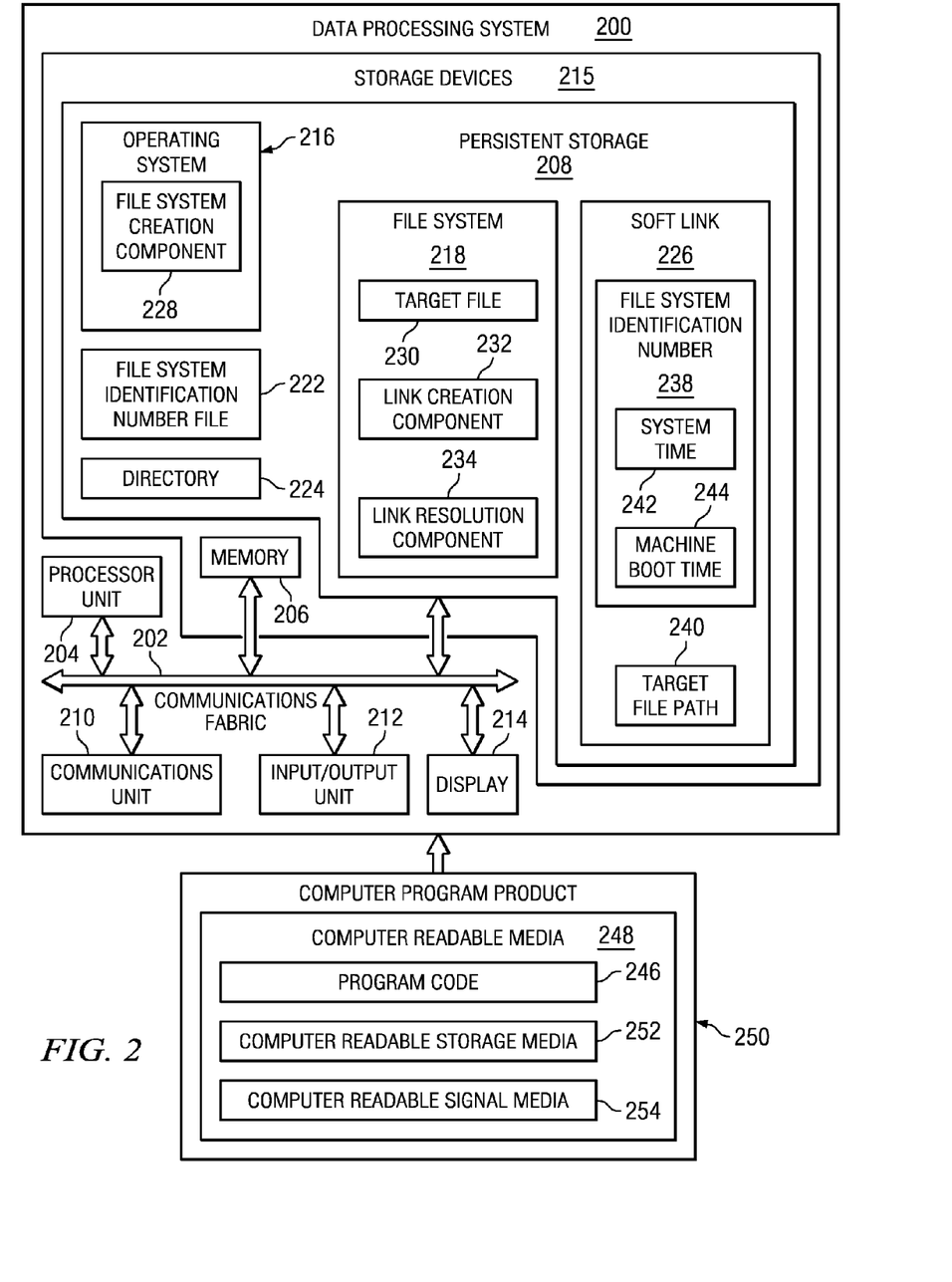
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and other various devices connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 also connect to network 102. Clients 110, 112, and 114 may, for example, be personal computers or network computers. In the depicted example, server 104 provides information, such as boot files, operating system images, and applications to clients 110, 112, and 114. Server 106 may, for example, be a network file server that provides data storage using multiple disk drives together to form a disk array. Clients 110, 112, and 114 are clients to server 104 and server 106 in this example. Storage unit 108 may, for example, be a data center or server farm, which is a collection of computer servers to accomplish data storage needs far beyond the capability of one machine. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN).

it should be noted that FIG. 1 is only intended as an example, and not as an architectural limitation for the different illustrative embodiments. For example, illustrative embodiments may be implemented in a stand-alone computer instead of in a network of computers.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 215. A storage device is any piece of hardware that is capable of storing information, such as, for example, without limitation, data, program code in functional form, and/or other suitable information either on a transient basis and/or a persistent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Persistent storage 208 stores operating system 216, file system 218, file system identification number file 222, directory 224, and soft link 226. Operating system 216 runs on processor unit 204 and coordinates and provides control of the various components within data processing system 200. Operating system 216 may be any commercially available operating system that supports soft links. Operating system 216 includes file system creation component 228. File system creation component 228 is a software component that generates file systems, such as file system 218.

File system 218 is a method for storing and organizing computer files, such as target file 230, and the data these files contain to make it easy to find and access them. File system 218 may use a physical data storage device, such as, for example, a hard disk drive or a CD-ROM, to store target file 230 and then maintain the physical location of target file 230 within the data storage device. File system 218 represents a plurality of file systems stored in persistent storage 208. Target file 230 is the target of an access request to perform, for example, a read or write operation on the file and represents a plurality of files within file system 218.

Each time file system creation component 228 generates a new file system, file system creation component 228 also generates a unique identification number for that newly created file system. As a result, each file system within the plurality of generated file systems in data processing system 200 has its own unique identification number associated with it. The unique identification number may, for example, be based on system time of data processing system 200. Alternatively, the unique identification number may be a tuple that not only includes a system time value, but also includes a machine boot time value. However, file system creation component 228 may use any method to generate a unique identification number for a newly generated file system. File system creation component 228 stores each unique file system identification number for the plurality of file systems in file system identification number file 222 for access by link creation component 232 and link resolution component 234. Link creation component 232 is a software component that generates a soft link, such as soft link 226, for a newly created file, such as target file 230, in file system 218. Link resolution component 234 is a software component that compares identification numbers during the soft link resolution process.

Directory 224 is an index of files, which may be scattered across persistent storage 208. Directory 224 may represent one or more directories. Directory 224 may be the mount point for one or more file systems.

Soft link 226 is a special type of file that contains a reference to a target file, such as target file 230 in this example, in the form of an absolute or relative file path and a reference to file system 216 in the form of a unique identification number. For example, soft link 226 includes file system identification number 238 and target file path 240. File system identification number 238 is a number that identities the correct file system that the target file of soft link 226 is located within. In this example, file system identification number 238 is the same as the unique identification number generated for file system 218. File system identification number 238 includes a tuple of system time 242 and machine boot time 244. System time 242 is a time value represented in seconds and is generated by a system clock. Machine boot time 244 is a time value represented in milliseconds and is generated by machine boot time.

Target file path 240 is a path to the location of a target file, such as target file 230, within file system 218. Operating system 216 accesses the correct target file within the plurality of target files in file system 218 using soft link 226, which includes file system identification number 238 and target file path 240.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for operating system 216, applications, and/or programs may be located on storage devices 215, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a server data processing system may be downloaded over a network from the server to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 248 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
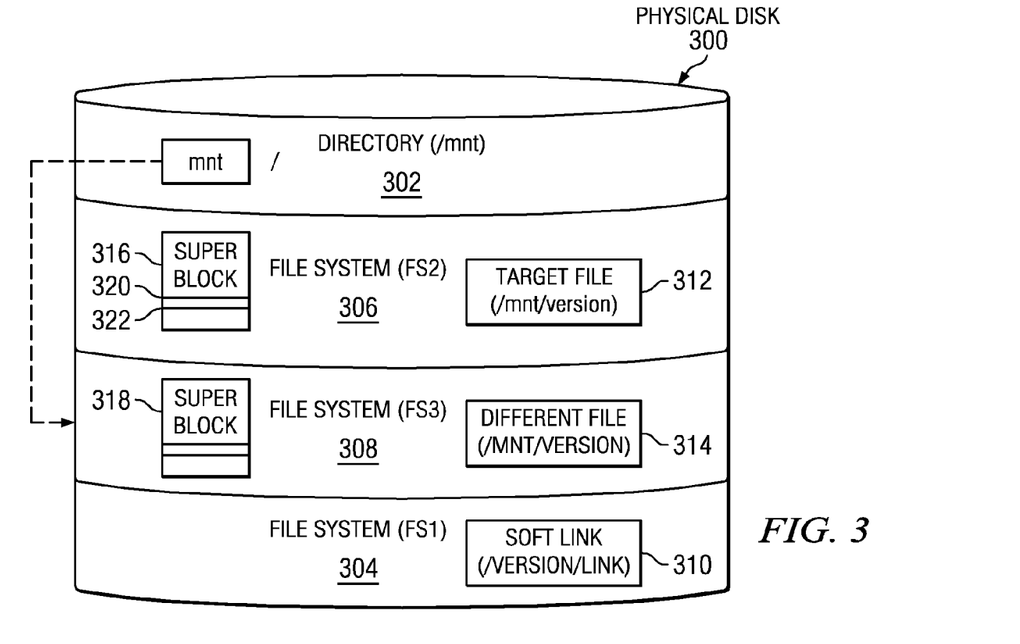
FIG. 3 is an exemplary illustration of a physical disk with a plurality of mounted file systems in accordance with an illustrative embodiment.

With reference now to FIG. 3, an exemplary illustration of a physical disk with a plurality of mounted file systems is depicted in accordance with an illustrative embodiment. Physical disk 300 is a persistent storage device, such as persistent storage 208 in FIG. 2. Physical disk 300 stores directory (/mnt) 302, such as directory 224 in FIG. 2. Directory (/mnt) 302 is the mount point for file system (FS1) 304, file system (FS2) 306, and/or file system (FS3) 308. File system (FS1) 304 includes soft link (/version/link) 310. Soft link (/version/link) 310 is a soft link to target file (/mnt/version) 312 in file system (FS2) 306 that is mounted over directory (/mnt) 302. Currently soft link implementations only include a file path to the target file that a soft link is pointing to.

In this example, file system (FS3) 308 that is also mounted over directory (/mnt) 302 includes different file (/mnt/version) 314, which also has the same file name and file path as target file (/mnt/version) 312 in file system (FS2) 306. As a result, in current implementations soil link (/version/link) 310 points to different file (/mnt/version) 314 in file system (FS3) 308, which is the wrong file system, instead of target file (/mnt/version) 312 in file system (FS2) 306, which is the correct file system. Consequently, a data integrity issue may result in different file (/mnt/version) 314.

To solve this problem in current implementations, illustrative embodiments generate a unique identification number for each of the file systems when the file systems are created to uniquely identify each of the file systems. Illustrative embodiments store this unique identification number in the metadata or superblock, such as superblock 316 and superblock 318, of the file systems. A superblock is a record of the characteristics of a file system. The unique identification number may include a tuple comprising a value based on system time, such as system time value 320, and a value based on machine boot time, such as machine boot time value 322.

When illustrative embodiments generate soft link (/version/link) 310 in file system (FS1) 304 to point to target file (/mnt/version) 312 in file system (FS2) 306, illustrative embodiments will read the tuple system time value 320 and machine boot time value 322 from superblock 316 in file system (FS2) 306 and write the tuple in soft link (/version/link) 310, along with the file path of target file (/mnt/version) 312.

When illustrative embodiments access soft link (/version/link) 310 to perform, for example, a write operation on target file (/mnt/version) 312 in file system (FS2) 306, illustrative embodiments will compare the values read from the soft link with the values read from the superblock of the file system on which the target file exists. If the values from the soft link match the values from the file system superblock, then illustrative embodiments will allow access to the target file to perform the desired operation. Otherwise, if the values for the soft link do not match the values from the file-system superblock, then illustrative embodiments will deny access to the different file rejecting the operation.

In this example, file system (FS3) 308 is mounted over directory (/mnt) 302, which is or was the mount point of file system (FS2) 306. As a result, illustrative embodiments will not allow access to different file (/mnt/version) 314 via soft link (/version/link) 310, because the tuple of soft link (/version/link) 310 does not match the tuple from the superblock of file system (FS3) 308.

Figure 4:
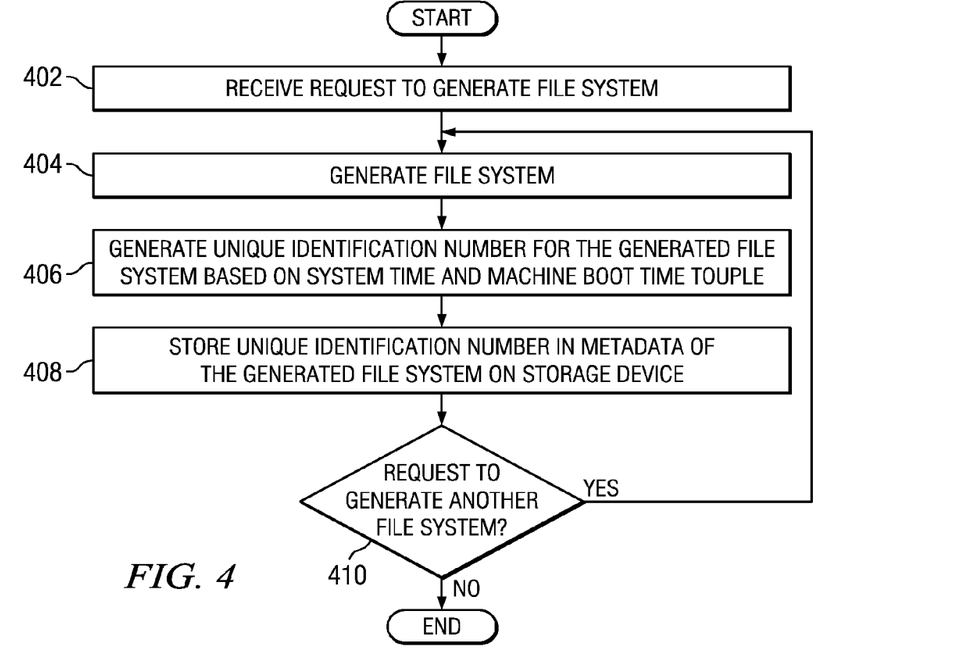
FIG. 4 is a flowchart illustrating an exemplary process for generating a unique identification number for a file system in accordance with an illustrative embodiment.

With reference now to FIG. 4, a flowchart illustrating an exemplary process for generating a unique identification number for a file system is shown in accordance with an illustrative embodiment. The process shown in FIG. 4 may be implemented in an operating system, such as operating system 216 in FIG. 2.

The process begins when the operating system receives a request to generate a file system, such as file system 218 in FIG. 2 (step 402). The request to generate the file system may manually come from a user using a data processing system, such as data processing system 200 in FIG. 2, or may automatically come from a program executing in the data processing system. The file system may, for example, be generated for a hard disk drive or a CD-ROM. Subsequent to receiving the request to generate the file system in step 402, the operating system utilizes a file system creation component, such as file system creation component 228 in FIG. 2, to generate the file system (step 404). In addition, the file system creation component also generates a unique identification number for the generated file system based on a system time and machine boot time tuple when the file system was generated (step 406).

Then, the file system creation component stores the unique identification number in metadata of the generated file system on a storage device, such as persistent storage 208 in FIG. 2 (step 408). The unique identification number is stored in the storage device within a file, such as file system identification number file 222 in FIG. 2. Afterward, the operating system makes a determination as to whether the operating system received another request to generate another file system (step 410). If the operating system did receive another request to generate another file system, yes output of step 410, then the process returns to step 404 where the file system creation component generates another file system. If the operating system did not receive another request to generate another file system, no output of step 410, then the process terminates thereafter.

Figure 5:
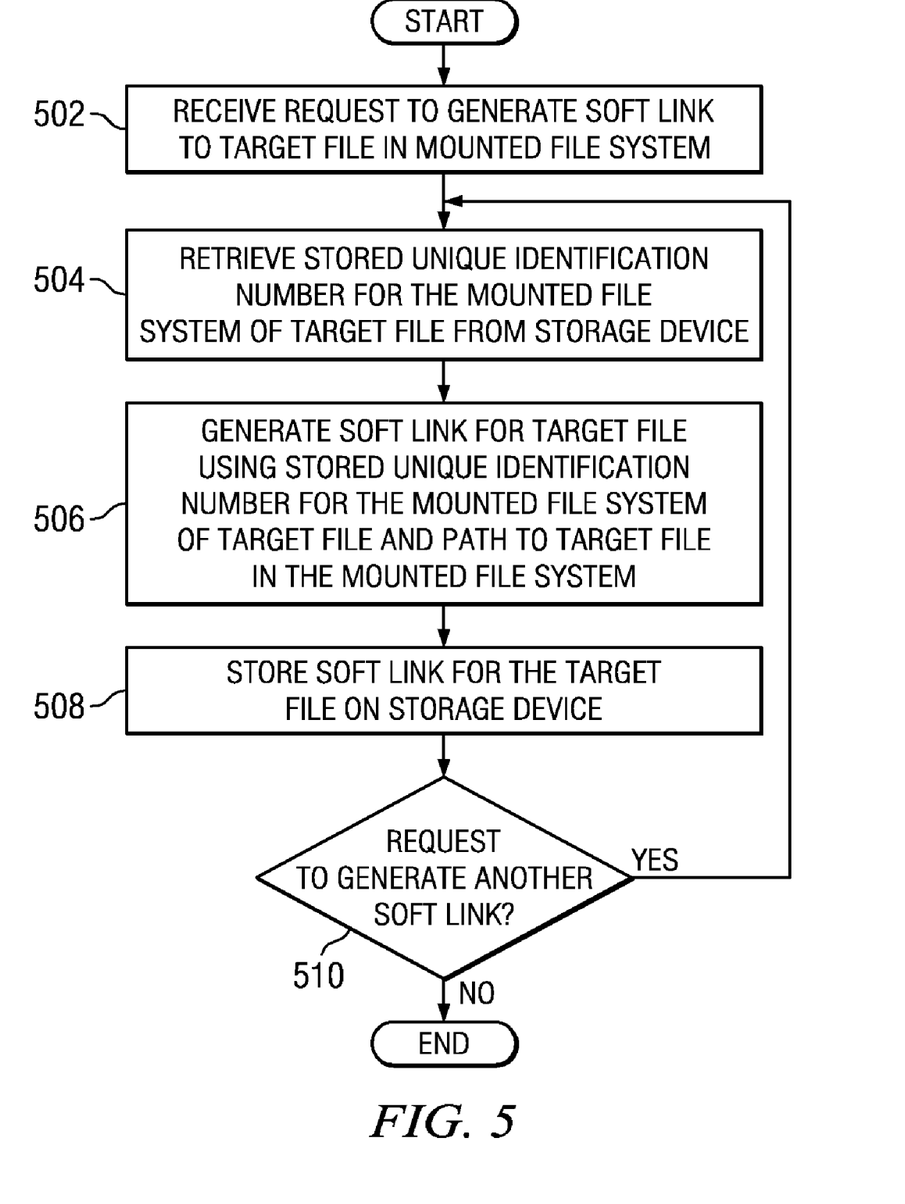
FIG. 5 is a flowchart illustrating an exemplary process for generating a soft link to a target file on a mounted file system in accordance with an illustrative embodiment.

With reference now to FIG. 5, a flowchart illustrating an exemplary process for generating a soft link to a target file on a mounted file system is shown in accordance with an illustrative embodiment. The process shown in FIG. 5 may be implemented in a file system, such as file system 218 in FIG. 2. The file system may be mounted on a directory, such as directory 224 in FIG. 2.

The process begins when a mounted file system receives a request to generate a soft link, such as soft link 226 in FIG. 2, to a target file, such as target file 230 in FIG. 2, in the mounted file system (step 502). The request may be manually received from a user or may be automatically received from a program or application. After receiving the request to generate the soft link in step 502, the mounted file system utilizes a link creation component to retrieve a stored unique identification number for the mounted file system of the target file from a storage device, such as persistent storage 208 in FIG. 2 (step 504). The unique identification number may be retrieved from a file, such as file system identification number file 222 in FIG. 2, in the storage device. Then, the link creation component generates the soft link for the target file using the stored unique identification number for the mounted file system of the target file, such as file system identification number 238 that includes system time 242 and machine boot time 244 in FIG. 2, and a path to the target file in the mounted file system, such as target file path 240 in FIG. 2 (step 506).

Subsequently, the link creation component stores the soft link for the target file on the storage device (step 508). Then, the mounted file system makes a determination as to whether the mounted file system received another request to generate another soft link (step 510). If the mounted file system did receive another request to generate another soft link, yes output of step 510, then the process returns to step 504. If the mounted file system did not receive another request to generate another soft link, no output of step 510, then the process terminates thereafter.

Figure 6:
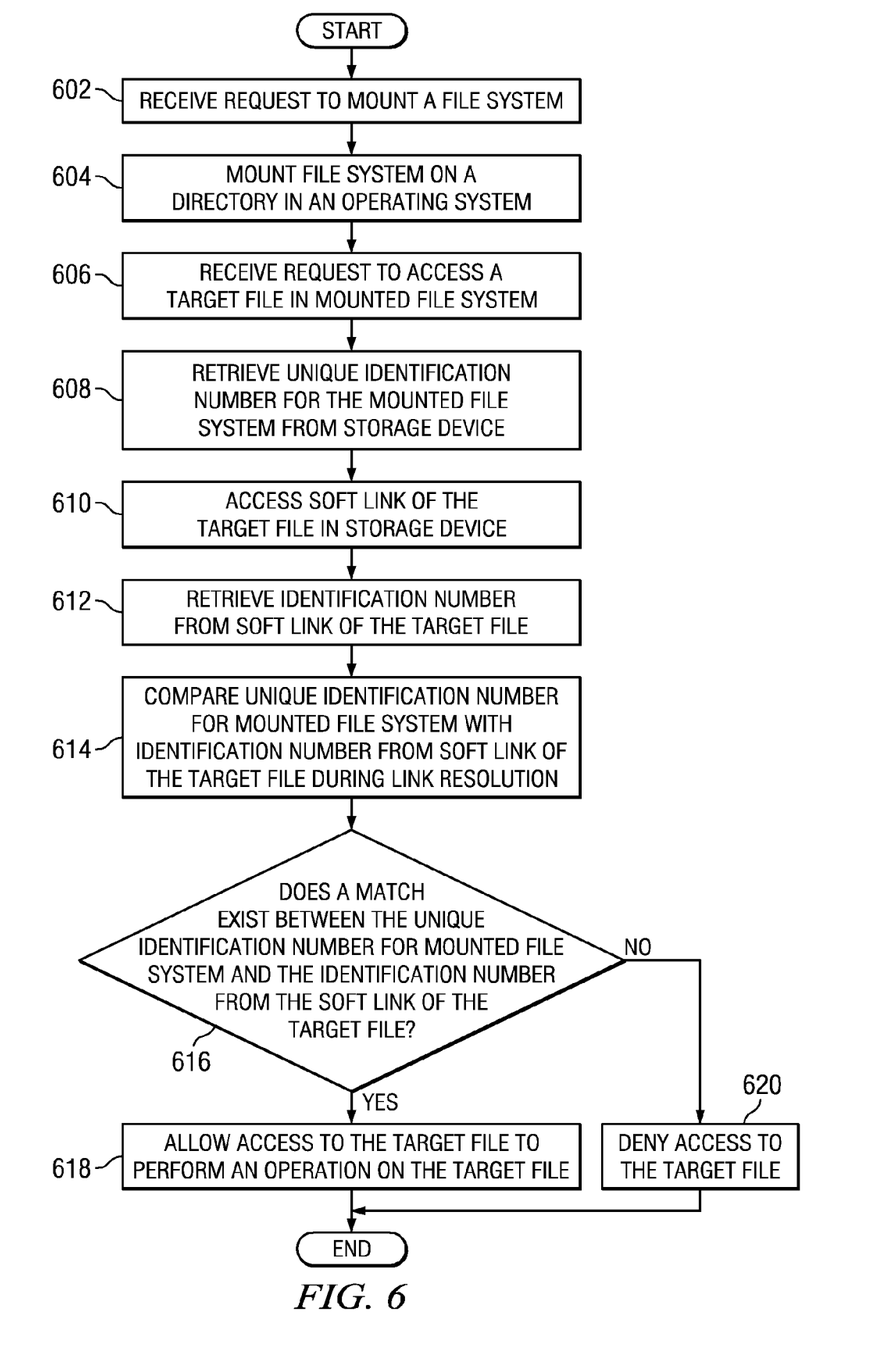
FIG. 6 is a flowchart illustrating an exemplary process for determining whether a soft link is pointing to the correct file system in accordance with an illustrative embodiment.

With reference now to FIG. 6, a flowchart illustrating an exemplary process for determining whether a soft link of a target file is pointing to the correct file system is shown in accordance with an illustrative embodiment. The process shown in FIG. 6 may be implemented in a file system, such as file system 218 in FIG. 2.

The process begins when an operating system, such as operating system 216 in FIG. 2, receives a request to mount a file system (step 602). The request may be manually received from a user or may be automatically received from a program or application. Subsequent to receiving the request to mount the file system in step 602, the operating system mounts the file system on a directory, such as directory 224 in FIG. 2, in the operating system (step 604).

Afterward, the mounted file system receives a request to access a target file, such as target file 230 in FIG. 2, in the mounted file system (step 606). Then, the mounted file system utilizes a link resolution component, such as link resolution component 234 in FIG. 2, to retrieve a unique identification number for the mounted file system from a storage device, such as persistent storage 208 in FIG. 2 (step 608). The unique identification number may be retrieved from a file, such as file system identification number file 222 in FIG. 2, in the storage device.

In addition, the link resolution component accesses a soft link of the target file, such as soft link 226 in FIG. 2, in the storage device (step 610) and retrieves an identification number from the soft link of the target file, such as file system identification number 238 that includes system time 242 and machine boot time 244 in FIG. 2 (step 612). Then, the link resolution component compares the unique identification number for the mounted file system with the identification number from the soft link of the target file during link resolution (step 614). Subsequently, the link resolution component makes a determination as to whether a match exists between the unique identification number for mounted file system and the identification number from the soft link of the target file (step 616).

If a match does exist between the unique identification number for mounted file system and the identification number from the soft link of the target file, yes output of step 616, then the link resolution component allows access to the target file to perform an operation on the target file (step 618). If a match does not exist between the unique identification number for mounted file system and the identification number from the soft link of the target file, no output of step 616, then the link resolution component denies access to the target file (step 620). The process terminates thereafter.

Thus, illustrative embodiments of the present invention provide a computer implemented method, apparatus, and computer program product for uniquely associating soft links of target files to a particular file system within a plurality of file systems to ensure that the soft links are still pointing to the correct file system. Illustrative embodiments enhance these soft links by storing a unique number that identities a file system, along with a target file path, in the soft links. Illustrative embodiments subsequently verify this number stored in the soft links with that of the unique file system identification number during link resolution. If the two identification numbers match, the soft links are pointing to the correct file system and access is granted. If the two identification numbers do not match, the soft links are not pointing to the correct file system and access is denied.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for determining whether a soft link of a target file is pointing to a correct file system, the computer implemented method comprising:

generating, by a computer, a plurality of file systems that store and organize a plurality of files:

generating, by the computer, a unique identification number tuple for each of the plurality of file systems based on a system time value and a machine boot time value when each of the plurality of file systems was generated;

mounting, by the computer, the plurality of file systems on a directory of an operating system in the computer, wherein two or more of the plurality of file systems contain a file with a same file name and file path;

receiving, by the computer, a request to access a target file within a particular file system in the plurality of file systems mounted on the directory;

retrieving, by the computer, the unique identification number of the particular file system that includes the system time value and the machine boot time value when the particular file system was generated from a storage device;

responsive to the computer accessing a soft link of the target file in the storage device, retrieving, by the computer, an identification number from the soft link of the target file;

determining, by the computer, whether a match exists between the unique identification number of the particular file system that includes the system time value and the machine boot time value when the particular file system was generated and the identification number from the soft link of the target file;

responsive to the computer determining that a match does exist between the unique identification number tuple of the particular file system that includes the system time value and the machine boot time value when the particular file system was generated and the identification number from the soft link of the target file, allowing, by the computer, access to the target file; and responsive to the computer determining that a match does not exist between the unique identification number of the particular file system that includes the system time value and the machine boot time value when the particular file system was generated and the identification number from the soft link of the target file, denying, by the computer, access to the target file.

2. The computer implemented method of claim 1 further comprising:

responsive to the computer receiving a request to generate the soft link to the target file in the particular file system, retrieving, by the computer, the unique identification number tuple of the particular file system that includes the system time value and the machine boot time value when the particular file system was generated from the storage device;

generating, by the computer, the soft link for the target file using the unique identification number tuple of the particular file system that includes the system time value and the machine boot time value when the particular file system was generated and a path to the target file in the file system; and storing, by the computer, the soft link of the target file on the storage device.

3. The computer implemented method of claim 1 further comprising:

storing the unique identification number tuple of particular the file system in a superblock of the particular file system on the storage device.

4. The computer implemented method of claim 1, wherein the identification number of the target file in the soft link is associated with a correct file system within the plurality of file systems mounted on the directory that the target file is stored within.

5. The computer implemented method of claim 1, wherein the system time value is measured in seconds and the machine boot time value is measured in milliseconds.

6. A computer system for determining whether a soft link of a target file is pointing to a correct file system, the computer system comprising:

a bus system;

a storage device connected to the bus system, wherein the storage device stores a set of instructions; and a processing unit connected to the bus system, wherein the processing unit executes the set of instructions to generate a plurality of file systems that store and organize a plurality of files;

generate a unique identification number tuple for each of the plurality of file systems based on a system time value and a machine boot time value when each of the plurality of file systems was generated;

mount the plurality of file systems on a directory of an operating system in the computer system, wherein two or more of the plurality of file systems contain a file with a same file name and file path;

receive a request to access a target file within a particular file system in the plurality of file systems mounted on the directory; retrieve the unique identification number of the particular file system that includes the system time value and the machine boot time value when the particular file system was generated from the storage device;

retrieve an identification number from a soft link of the target file in response to accessing the soft link of the target file in the storage device;

determine whether a match exists between the unique identification number tuple of the particular file system that includes the system time value and the machine boot time value when the particular file system was generated and the identification number from the soft link of the target file;

allow access to the target file in response to determining that a match does exist between the unique identification number tuple of the particular file system that includes the system time value and the machine boot time value when the particular file system was generated and the identification number from the soft link of the target file; and wherein the processing unit executes a further set of instructions to deny access to target file in response to determining that a match does not exist between the unique identification number tuple of the particular file system that includes the system time value and the machine boot time value when the particular file system was generated and the identification number from the soft link of the target file.

7. The computer system of claim 6, wherein the processing unit executes a further set of instructions to retrieve the unique identification number tuple of the particular file system that includes the system time value and the machine boot time value when the particular file system was generated from the storage device in response to receiving a request to generate the soft link to the target file in the particular file system; generate the soft link for the target file using the unique identification number tuple of the particular file system that includes the system time value and the machine boot time value when the particular file system was generated and a path to the target file in the particular file system; and store the soft link of the target file on the storage device.

8. The computer system of claim 6, wherein the processing unit executes a further set of instructions to store the unique identification number tuple of particular the file system in a superblock of the particular file system on the storage device.

9. The computer system of claim 6, wherein the identification number of the target file in the soft link is associated with a correct file system within the plurality of file systems mounted on the directory that the target file is stored within.

10. The computer system of claim 6, wherein the system time value is measured in seconds and the machine boot time value is measured in milliseconds.

11. A computer program product stored on a computer readable storage medium device having computer usable program code embodied thereon that is executable by a computer for determining whether a soft link of a target file is pointing to a correct file system, the computer program product comprising:

- computer usable program code for generating a plurality of file systems that store and organize a plurality of files;
- computer usable program code for generating a unique identification number tuple for each of the plurality of file systems based on a system time value and a machine boot time value when each of the plurality of file systems was generated;
- computer usable program code for mounting the plurality of file systems on a directory of an operating system in the computer, wherein two or more of the plurality of file systems contain a file with a same file name and file path;
- computer usable program code for receiving a request to access a target file within a particular file system in the plurality of file systems mounted on the directory;
- computer usable program code for retrieving the unique identification number tuple of the particular file system that includes the system time value and the machine boot time value when the particular file system was generated from a storage device;
- computer usable program code for retrieving an identification number from a soft link of the target file in response to accessing the soft link of the target file in the storage device;
- computer usable program code for determining whether a match exists between the unique identification number tuple of the particular file system that includes the system time value and the machine boot time value when the particular file system was generated and the identification number from the soft link of the target file;
- computer usable program code for allowing access to the target file in response to determining that a match does exist between the unique identification number tuple of the particular file system that includes the system time value and the machine boot time value when the particular file system was generated and the identification number from the soft link of the target file; and
- computer usable program code for denying access to the target file in response to determining that a match does not exist between the unique identification number tuple of the particular file system that includes the system time value and the machine boot time value when the particular file system was generated and the identification number from the soft link of the target file.

12. The computer program product of claim 11 further comprising:

- computer usable program code for retrieving the unique identification number tuple of the particular file system that includes the system time value and the machine boot time value when the particular file system was generated from the storage device in response to receiving a request to generate the soft link to the target file in the particular file system;
- computer usable program code for generating the soft link for the target file using the unique identification number tuple of the particular file system that includes the system time value and the machine boot time value when the particular file system was generated and a path to the target file in the particular file system; and
- computer usable program code for storing the soft link of the target file on the storage device.

13. The computer program product of claim 11 further comprising:

- computer usable program code for storing the unique identification number tuple of particular the file system in a superblock of the particular file system on the storage device.

14. The computer program product of claim 11, wherein the identification number of the target file in the soft link is associated with a correct file system within the plurality of file systems mounted on the directory that the target file is stored within.

15. The computer program product of claim 11, wherein the system time value is measured in seconds and the machine boot time value is measured in milliseconds.

* * * * *